United States Patent [19]

Reynolds et al.

[11] Patent Number: 4,609,472
[45] Date of Patent: Sep. 2, 1986

[54] PROCESS FOR REMOVAL OF ALKALI METAL CHLORATE FROM ALKALI METAL CHLORIDE BRINES

[75] Inventors: Don E. Reynolds, Athens; James D. Kilby, Cleveland, both of Tenn.

[73] Assignee: Olin Corporation, Cheshire, Conn.

[21] Appl. No.: 717,768

[22] Filed: Mar. 29, 1985

[51] Int. Cl.$^4$ .............................................. C02F 1/70
[52] U.S. Cl. ................................. 210/750; 210/754; 210/757; 204/98; 423/351; 423/479; 423/481
[58] Field of Search ............... 210/749, 750, 754, 757; 204/98; 423/351, 407, 408, 479, 481

[56] References Cited

U.S. PATENT DOCUMENTS

| | | | |
|---|---|---|---|
| 3,823,225 | 7/1974 | Sprague | 423/478 |
| 4,169,773 | 10/1979 | Lai et al. | 204/98 |
| 4,268,486 | 5/1981 | Noack et al. | 423/55 |
| 4,397,720 | 8/1983 | Moore et al. | 210/757 |
| 4,443,307 | 4/1984 | Moore et al. | 204/98 |
| 4,481,088 | 11/1984 | Moore et al. | 204/98 |

FOREIGN PATENT DOCUMENTS 53-18498  2/1978  Japan ........................... 204/98

OTHER PUBLICATIONS

Mellor, J. W.; "A Comprehensive Treatise on Inorganic & Theoretical Chemistry", vol. VIII, pp. 313, 314 & 321 (1947).
Clark, C. C., Hydrazine, p. 13, Mathieson Chemical Corporation, Baltimore, Maryland, 1953.

*Primary Examiner*—Benoit Castel
*Attorney, Agent, or Firm*—James B. Haglind; Thomas P. O'Day

[57] ABSTRACT

A process for removing chlorate ions from an impure alkali metal chloride brine removed from an electrolytic cell comprises acidifying the impure brine to a pH of less than about 2. The acidified brine is then reacted with a reducing portion of hydrazine hydrochloride.

The novel process rapidly reduces the chlorate ions in the absence of the formation of chlorine and chlorine dioxide gases and with the production of nitrogen gas as a product.

8 Claims, 1 Drawing Figure

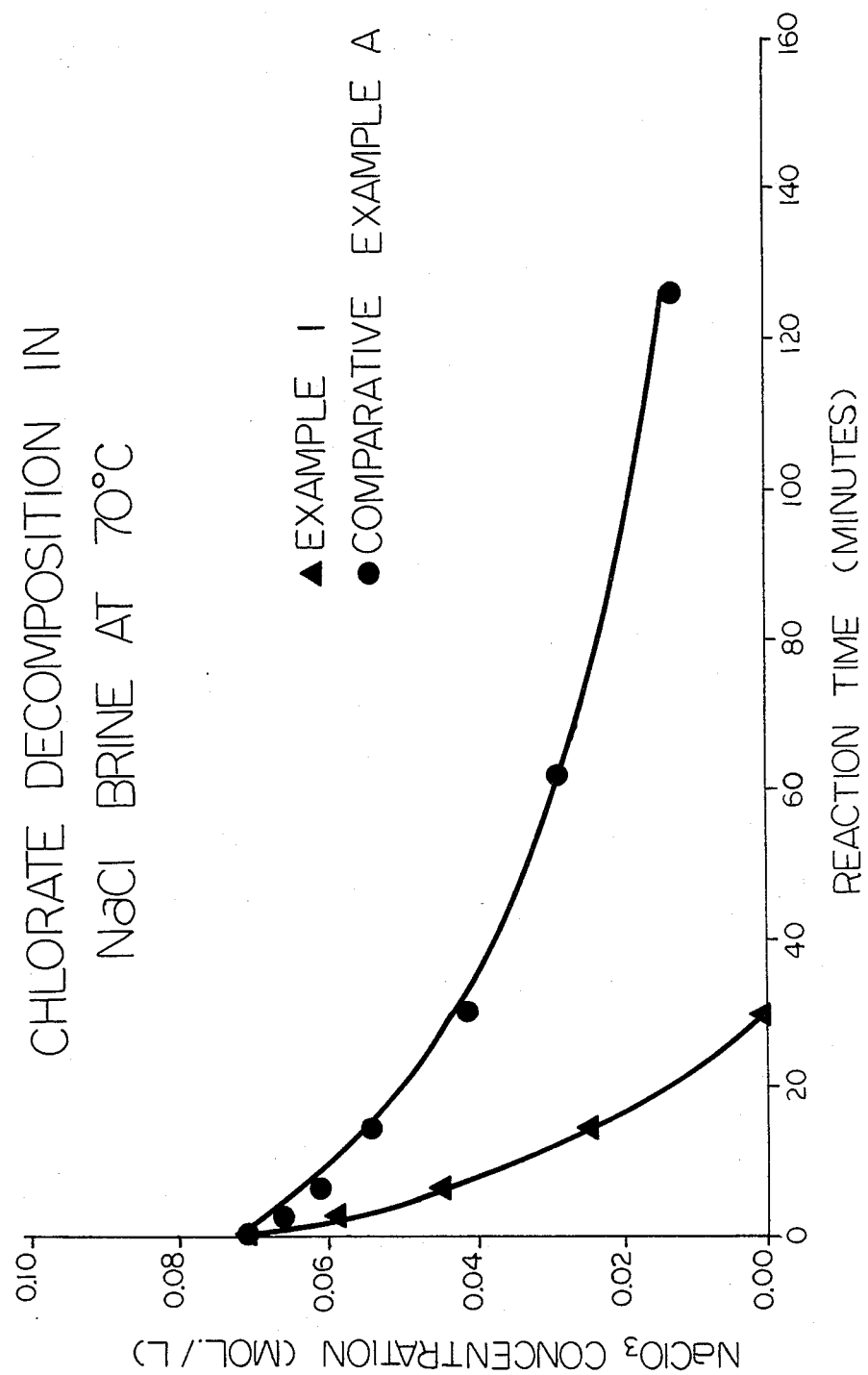

PROCESS FOR REMOVAL OF ALKALI METAL CHLORATE FROM ALKALI METAL CHLORIDE BRINES

This invention relates to the purification of alkali metal chloride brines. More specifically, this invention relates to the removal of alkali metal chlorates from alkali metal chloride brines removed from electrolytic cells.

During the electrolysis process for producing chlorine and alkali metal hydroxides from alkali metal chloride brines in a membrane or mercury electrolytic cell, an alkali metal chlorate such as sodium chlorate or potassium chlorate is produced as an unwanted impurity. In a closed loop brine system, while the amount produced is small per pass through the cell, if not removed, the concentration will build up to unacceptable levels.

One well known method of controlling the chlorate ion concentration is to purge a portion of the brine removed from the cell ("spent brine"). As the brine is highly acidic and contains dissolved chlorine gas, however, this method requires treatment of the purged portion to reduce the chlorine concentration and to neutralize the brine before it may be discharged.

Another well known method is the acidification of the spent brine or a portion thereof, with an acid such as hydrochloric acid. This method is believed to be represented by the following equations:

$$NaClO_3 + 2HCl \rightarrow ClO_2 + \tfrac{1}{2}Cl_2 + H_2O + NaCl \tag{1}$$

$$NaClO_3 + 6HCl \rightarrow 3Cl_2 + 3H_2O + NaCl \tag{2}$$

While destroying the chlorate, this method requires excessive amounts of acid and produces an off-gas which is a mixture of chlorine and chlorine dioxide. Thus a further treatment, for example, with heat or ultraviolet radiation, is required to destroy the chlorine dioxide present.

There is a need, therefore, for a method of removing alkali metal chlorates from alkali metal chloride brines which produce by-products which are innocuous to the electrolytic cell process.

It is an object of the present invention to provide a process for removing alkali metal chlorate impurities from alkali metal chloride brines from electrolytic cells in which any by-products are innocuous to and compatible with the electrolytic cell process.

Another object of the present invention is to provide a process for removing alkali metal chlorate impurities from alkali metal chloride brines from electrolytic cells both rapidly and completely.

These and other objects of the invention are accomplished in a process for removing chlorate ions from an impure alkali metal chloride brine removed from an electrolytic cell brine which comprises acidifying said impure brine to a pH of less than about 2 and reacting said acidified impure brine with a reducing portion of hydrazine hydrochloride.

More in detail, any aqueous alkali metal chloride brine removed from an electrolytic cell and containing chlorate ions as an impurity may be treated by the novel process of the present invention. Suitable alkali metal chloride brines include sodium chloride and potassium chloride. When removed from an electrolytic cell such as a mercury cell or membrane cell, the brine contains hypochlorite and chlorate ions as impurities as well as dissolved chlorine gas.

The impure brine to be treated by the novel process of the present invention, when removed from the cell, is at a pH below 6, usually in the range of 3–4. In the novel process of the present invention, the impure brine is acidified with an inorganic acid such as hydrochloric acid, sulfuric acid or phosphoric acid reducing the pH of the impure brine to below about 2, for example, by converting a substantial portion of the chlorate ions present to chloric acid. In the processes of the prior art, the sole source of the H+ ions was by the addition of an acid such as hydrochloric acid. In addition to producing chlorine dioxide, the reaction time required to reduce the chlorate ion concentration is considerable. The present process, however, utilizes an inorganic acid and hydrazine hydrochloride to provide the necessary H+ ions. While not wishing to be bound by theory, in the novel process of the present invention, it is believed that, for example, hydrochloric acid reacts with any chlorate ion present to produce $Cl_2$ and $ClO_2$ according to equations (1) and (2) above. Hydrazine hydrochloride present reacts with dissolved chlorine present and chlorine dioxide produced to form hydrochloric acid according to the following equations:

$$2Cl_2 + N_2H_4\cdot HCl \rightarrow N_2 + 5HCl \tag{3}$$

$$4ClO_2 + N_2H_4\cdot HCl \rightarrow N_2 + 8H_2O + 9HCl \tag{4}$$

In addition, hydrazine hydrochloride reacts directly with chlorate present according to the following equation:

$$4NaClO_3 + 5N_2H_4\cdot HCl \rightarrow 5N_2 + HCl + 2Cl_2 + 12H_2O + 4NaCl \tag{5}$$

Chlorate ions as well as chlorine and chlorine dioxide present in the impure alkali metal chloride brine are destroyed rapidly and completely to yield nitrogen gas as an innocuous by-product as well as chloride ion (hydrogen chloride) as a desired component of the treated brine.

The process of the present invention is operated at any suitable temperature. Temperatures of brines removed from electrolytic cells are normally in the range of 45° to 90° C. but higher or lower temperatures may be used if desired. At the temperatures of the impure brine when removed from the electrolytic cell, additional energy is usually not required to heat or cool the brine. Suitable amounts of hydrazine hydrochloride used in the process are those which provide a molar ratio of hydrazine hydrochloride to chlorate ion in the range from about 0.1:1 to about 2:1, preferably from about 0.5:1 to about 1.75:1, and more preferably from about 1.2:1 to about 1.5:1.

In a preferred embodiment, impure brine removed from a mercury cell or membrane cell is treated with an acid such as hydrochloric acid to reduce the pH of the brine to about 2. Dissolved chlorine gas is removed from the brine by known methods such as flash evaporation. The dechlorinated brine containing chlorate ions is then acidified to reduce the pH to less than about 2 and the reducing portion of hydrazine hydrochloride added. While the entire impure brine stream removed from the cell may be treated, it is preferred to treat only a portion of the impure brine stream. Admixing the chlorate-free portion of the brine with the untreated portion maintains the chlorate ion concentration in the entire stream at acceptable levels.

Nitrogen gas is produced in the process of the present invention and effervesces from the treated brine. The nitrogen gas may be recovered from the brine treatment vessel, passed through a scrubber or filter where required to remove impurities such as brine vapor, and used in cooling or "padding" operations or any other applications where an inert gas is required.

The novel process of the present invention rapidly removes chlorate ions from alkali metal chloride brines while producing by-products which are innocuous to the operation of electrolytic cells. Brines treated in the process are free of chlorine dioxide and chlorine gas. Capital costs are lowered as the process can be carried out in reactors having reduced volumes as compared with reactors in processes employing acid treatment alone.

Further illustrations of the novel process of the present invention are provided by the following examples with no intention of being limited thereby. All parts and percentages are by weight unless otherwise indicated.

EXAMPLE 1

A sodium chloride brine containing 200 grams per liter of NaCl, 7.35 grams per liter $Na_2SO_4$ and 8.17 grams per liter of $NaClO_3$, at a temperature of 70° C., was treated in a reaction vessel with 0.714 mols per liter of HCl and 1.5 mols of hydrazine hydrochloride, $N_2H_4 \cdot HCl$, per mole of sodium chlorate to provide a mol ratio of $N_2H_4 \cdot HCl$ to $ClO_3^-$ of 1.5:1. The temperature of the treated brine during the initial reaction period rose to 72° C. and vigorous effervescence indicating the formation of nitrogen gas could be seen. After about 10 minutes the reaction temperature dropped back to 70° C. and the temperature was maintained at 70° C. throughout the remainder of the reaction period. After about 20 minutes, the effervescence was greatly reduced and had completely stopped after about 30 minutes. Measurements of the chlorate ion concentration in the treated brine, taken periodically, were as follows:

| Time: | $ClO_3^-$ Concentration |
|---|---|
| $t_0 =$ | 0.0694 mols/liter |
| $t_2 =$ | 0.0573 mols/liter |
| $t_6 =$ | 0.0445 mols/liter |
| $t_{14} =$ | 0.0242 mols/liter |
| $t_{30} =$ | 0.0000 mols/liter |

These results are illustrated on the Figure. A scrubber containing a solution having 5% of NaOH and 5% KI by weight was connected in series to the reaction vessel to trap any gases evolved. Analysis of the scrubber solution taken at the same time intervals as the chlorate ion measurements are as follows:

| Time | Scrubber Solution Analysis |
|---|---|
| $t_2 =$ | 0.0 gpl $NaClO_3$ |
| | 0.0 gpl NaOCl |
| $t_6 =$ | 0.0 gpl $NaClO_3$ |
| | 0.0 gpl NaOCl |
| $t_{14} =$ | 0.0 gpl $NaClO_3$ |
| | 0.0 gpl NaOCl |
| $t_{30} =$ | 0.0 gpl $NaClO_3$ |
| | 0.0 gpl NaOCl |

COMPARATIVE EXAMPLE A

The process of EXAMPLE 1 was repeated exactly with a sodium chloride brine (184 gpl) containing 7.54 gpl of $NaClO_3$ with the sole exception being that hydrazine hydrochloride was not added to the impure brine. Measurements of the chlorate ion concentration were taken periodically and were found to be as follows:

| Time (mins.) | $ClO_3^-$ (mols/liter) |
|---|---|
| $t_0$ | 0.0708 |
| $t_2$ | 0.0639 |
| $t_6$ | 0.0593 |
| $t_{14}$ | 0.0558 |
| $t_{30}$ | 0.0465 |
| $t_{62}$ | 0.0321 |
| $t_{126}$ | 0.0157 |

These results are illustrated on the FIGURE.

Analysis of the scrubber solution taken at the same time intervals as the chlorate ion measurements is as follows:

| Time | Scrubber Solution Analysis |
|---|---|
| $t_2 =$ | 0.072 gpl $NaClO_3$ |
| | 0.015 gpl NaOCl |
| $t_6 =$ | 0.16 gpl $NaClO_3$ |
| | 0.94 gpl NaOCl |
| $t_{14} =$ | 0.21 gpl $NaClO_3$ |
| | 1.82 gpl NaOCl |
| $t_{30} =$ | 0.31 gpl $NaClO_3$ |
| | 2.47 gpl NaOCl |

COMPARATIVE EXAMPLE B

The process of EXAMPLE 1 was repeated exactly with the exception that only enough hydrochloric acid was added to reduce the brine pH to 2. The reaction was maintained for one hour. At the end of this period, the brine was analyzed and 8.03 grams per liter of chlorate ion remained in the brine (98.8%) indicating that no significant amounts of the chlorate ion concentration had been reduced.

What is claimed:

1. A process for removing chlorate ions from an impure alkali Metal chloride brine removed from an electrolytic cell which consists essentially of acidifying said impure brine to a pH of less than about 2 and reacting said acidified impure brine with a reducing portion of hydrazine hydrochloride wherein the molar ratio of hydrazine hydrochloride to chlorate ion is at least about 0.1:1.

2. The process of claim 1 in which said impure brine is acidified with an inorganic acid selected from the group consisting of hydrochloric acid, sulfuric acid and phosphoric acid.

3. The process of claim 2 in which the reducing portion is a molar ratio of hydrazine hydrochloride to chlorate ion in the range of from about 0.1:1 to about 2:1.

4. The process of claim 3 in which said inorganic acid is hydrochloric acid.

5. The process of claim 4 in which a portion of the impure brine removed from said electrolytic cell is reacted with said hydrazine hydrochloride.

6. The process of claim 5 in which said molar ratio of hydrazine hydrochloride to chlorate ion is in the range of from about 0.5:1 to about 1.75:1.

7. A process for producing nitrogen gas in an impure alkali metal chloride brine containing chlorate ions removed from an electrolytic cell which consists essentially of acidifying said impure brine to a pH of less than about 2 and reacting said chlorate ions with a reducing portion of hydrazine hydrochloride to produce nitrogen gas wherein the molar ratio of hydrazine hydrochloride to chlorate ion is at least about 0.1:1, and recovering said nitrogen gas.

8. A process for purifying an impure alkali metal chloride brine containing dissolved chlorine and chlorate ions removed from an electrolytic cell which consists essentially of:
 (a) acidifying said impure alkali metal chloride brine to a pH of about 2;
 (b) removing dissolved chlorine from said acidified impure brine to produce a chlorine-free brine;
 (c) cadding an inorganic acid to said chlorine-free brine to reduce the pH to less than about 2; and
 (d) treating said chlorine-free brine with a reducing portion of hydrazine hydrochloride wherein the molar ratio of hydrazine hydrochloride to chlorate ion is at least about 0.1:1.

* * * * *